US011742487B2

(12) United States Patent
Otsuka et al.

(10) Patent No.: US 11,742,487 B2
(45) Date of Patent: Aug. 29, 2023

(54) BINDER COMPOSITION FOR NON-AQUEOUS SECONDARY BATTERY POSITIVE ELECTRODE, COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Yusuke Otsuka, Tokyo (JP); Norikazu Yamamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 799 days.

(21) Appl. No.: 16/490,576

(22) PCT Filed: Mar. 16, 2018

(86) PCT No.: PCT/JP2018/010620
§ 371 (c)(1),
(2) Date: Sep. 2, 2019

(87) PCT Pub. No.: WO2018/173975
PCT Pub. Date: Sep. 27, 2018

(65) Prior Publication Data

US 2020/0127291 A1 Apr. 23, 2020

(30) Foreign Application Priority Data

Mar. 23, 2017 (JP) ................................ 2017-058137

(51) Int. Cl.

| | |
|---|---|
| ***H01M 4/62*** | (2006.01) |
| ***H01M 10/0525*** | (2010.01) |
| ***C08F 236/12*** | (2006.01) |
| ***C08C 19/02*** | (2006.01) |
| ***C08L 9/02*** | (2006.01) |
| ***H01M 4/02*** | (2006.01) |

(52) U.S. Cl.
CPC ............. *H01M 4/622* (2013.01); *C08C 19/02* (2013.01); *C08F 236/12* (2013.01); *C08L 9/02* (2013.01); *H01M 10/0525* (2013.01); *H01M 2004/028* (2013.01)

(58) Field of Classification Search
CPC ............... H01M 4/62; H01M 10/0525; H01M 2300/0025; H01M 2004/028; C08C 19/02; C08F 236/12; C08L 9/02
See application file for complete search history.

(56) References Cited

U.S. PATENT DOCUMENTS

| | | | | |
|---|---|---|---|---|
| 7,262,244 B2 | 8/2007 | Guerin | | |
| 2010/0324226 A1* | 12/2010 | Hosotani | C08F 236/12 | 525/338 |
| 2013/0330622 A1 | 12/2013 | Sasaki | | |
| 2015/0118556 A1* | 4/2015 | Jeong | H01M 4/622 | 524/832 |
| 2015/0357648 A1* | 12/2015 | Sugimoto | H01M 4/622 | 429/217 |
| 2016/0122457 A1 | 5/2016 | Katada et al. | | |
| 2017/0352915 A1 | 12/2017 | Katagiri et al. | | |

FOREIGN PATENT DOCUMENTS

| | | | |
|---|---|---|---|
| JP | H0963590 A | 3/1997 | |
| JP | H11297329 A | 10/1999 | |
| JP | 4509792 B2 | 7/2010 | |
| WO | 2012115096 A1 | 8/2012 | |
| WO | WO2014038836 * | 3/2014 | H01M 10/052 |
| WO | 2014119790 A1 | 8/2014 | |
| WO | 2016103730 A1 | 6/2016 | |

OTHER PUBLICATIONS

Sep. 24, 2019, International Preliminary Report on Patentability issued in the International Patent Application No. PCT/JP2018/010620.
Jul. 27, 2021, Communication pursuant to Article 94(3) EPC issued by the European Patent Office in the corresponding European Patent Application No. 18771373.0.
Dec. 15, 2020, the Supplementary European Search Report issued by the European Patent Office in the corresponding European Patent Application No. 18771373.0.
Jan. 12, 2021, Communication pursuant to Article 94(3) EPC issued by the European Patent Office in the corresponding European Patent Application No. 18771373.0.

* cited by examiner

*Primary Examiner* — Kiran Quraishi Akhtar
(74) *Attorney, Agent, or Firm* — Kenja IP Law PC

(57) ABSTRACT

Provided is a binder composition for a non-aqueous secondary battery positive electrode, a composition for a non-aqueous secondary battery positive electrode, a positive electrode for a non-aqueous secondary battery, and a non-aqueous secondary battery that can favorably maintain the balance among the paste stability of the composition for a positive electrode prepared using the binder composition, the peel strength of the positive electrode mixed material layer formed using the composition for a positive electrode, and the output characteristics of the secondary battery using the positive electrode including the positive electrode mixed material layer. The binder composition comprises: a polymer; and an organic solvent, wherein the polymer contains at least one of a conjugated diene monomer unit and an alkylene structural unit, and contains a nitrile group-containing monomer unit, and solution turbidity of the binder composition for a non-aqueous secondary battery positive electrode is 1 or more and 80 or less.

5 Claims, No Drawings

BINDER COMPOSITION FOR NON-AQUEOUS SECONDARY BATTERY POSITIVE ELECTRODE, COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery positive electrode, a composition for a non-aqueous secondary battery positive electrode, a positive electrode for a non-aqueous secondary battery, and a non-aqueous secondary battery.

BACKGROUND

Non-aqueous secondary batteries (non-aqueous electrolyte solution secondary batteries) such as lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher non-aqueous secondary battery performance.

A positive electrode for a non-aqueous secondary battery generally includes a current collector and an electrode mixed material layer (positive electrode mixed material layer) formed on the current collector. The positive electrode mixed material layer is formed, for example, using a slurry composition in which a positive electrode active material, a binder composition containing a binder, and so forth are dispersed in a dispersion medium.

In recent years, there have been attempts to improve binder compositions used in the formation of positive electrode mixed material layers in order to further improve non-aqueous secondary battery performance.

Specifically, a binder composition for a non-aqueous secondary battery positive electrode capable of forming a positive electrode with which a non-aqueous secondary battery having excellent life characteristics can be obtained has been proposed (for example, see PTL 1).

CITATION LIST

Patent Literature

PTL 1: WO 2016/103730 A1

SUMMARY

Technical Problem

There is a need to stably obtain a secondary battery having favorable output characteristics. The conventional binder composition, however, has room for improvement in favorably maintaining the balance among the paste stability of the composition for a positive electrode prepared using the binder composition, the peel strength of the positive electrode mixed material layer formed using the composition for a positive electrode, and the output characteristics of the secondary battery using the positive electrode including the positive electrode mixed material layer.

It could therefore be helpful to provide a binder composition for a non-aqueous secondary battery positive electrode, a composition for a non-aqueous secondary battery positive electrode, a positive electrode for a non-aqueous secondary battery, and a non-aqueous secondary battery that can favorably maintain the balance among the paste stability of the composition for a positive electrode, the peel strength of the positive electrode mixed material layer, and the output characteristics of the secondary battery.

Solution to Problem

Through extensive studies to solve the problems, the inventors discovered that, by using a binder composition that contains a polymer including a specific monomer unit and an organic solvent and has solution turbidity of 1 or more and 80 or less, the balance among the paste stability of the composition for a positive electrode, the peel strength of the positive electrode mixed material layer, and the output characteristics of the secondary battery can be maintained favorably.

To advantageously solve the problems stated above, a binder composition for a non-aqueous secondary battery positive electrode according to the present disclosure comprises: a polymer; and an organic solvent, wherein the polymer contains at least one of a conjugated diene monomer unit and an alkylene structural unit, and contains a nitrile group-containing monomer unit, and solution turbidity of the binder composition for a non-aqueous secondary battery positive electrode is 1 or more and 80 or less. As a result of the solution turbidity of the binder composition for a non-aqueous secondary battery positive electrode containing the predetermined polymer and the organic solvent being 1 or more and 80 or less, the balance among the paste stability of the composition for a positive electrode prepared using the binder composition, the peel strength of the positive electrode mixed material layer formed using the composition for a positive electrode, and the output characteristics of the secondary battery using the positive electrode including the positive electrode mixed material layer can be maintained favorably.

Herein, "including a monomer unit" means that "a structural unit derived from that monomer is included in a polymer obtained using that monomer".

Herein, the "solution turbidity" of the binder composition for a non-aqueous secondary battery positive electrode is measured in the case where the solid content concentration in the binder composition is 10 mass %, as described in the EXAMPLES section. For example, after calibration with a standard solution (produced by Kasahara Chemical Instruments Corp.) of a miscible standard turbidity solution (polystyrene) of 10 degrees and 100 degrees, 10 mL of the binder composition for a non-aqueous secondary battery positive electrode is collected and the solution turbidity is measured using a turbidity meter TR-55 (produced by Kasahara Chemical Instruments Corp.).

Preferably, the binder composition for a non-aqueous secondary battery positive electrode according to the present disclosure comprises a metal ion. As a result of the binder composition for a non-aqueous secondary battery positive electrode containing the metal ion, the polymer can be favorably coagulated and then hydrogenated. This suppresses inclusion of a residue (impurity), so that the performance of the secondary battery can be improved.

Preferably, in the binder composition for a non-aqueous secondary battery positive electrode according to the present disclosure, the metal ion includes at least one selected from the group consisting of an aluminum ion, a calcium ion, and a magnesium ion. As a result of the metal ion including at least one selected from the group consisting of an aluminum ion, a calcium ion, and a magnesium ion, the metal ion is prevented from forming a metal salt with a residue in polymerization, and consequently the performance of the secondary battery can be improved.

Preferably, in the binder composition for a non-aqueous secondary battery positive electrode according to the present disclosure, a concentration of the metal ion is 50 mass ppm or more and 4000 mass ppm or less. Thus, the balance among the paste stability of the composition for a positive electrode, the peel strength of the positive electrode mixed material layer, and the output characteristics of the secondary battery can be maintained more favorably.

Herein, the "metal ion concentration" in the binder composition for a non-aqueous secondary battery positive electrode can be measured using ICP emission spectral analysis (ICP-AES).

Preferably, in the binder composition for a non-aqueous secondary battery positive electrode according to the present disclosure, a content proportion of the nitrile group-containing monomer unit in the polymer is 20 mass % or more and 60 mass % or less. Thus, the peel strength of the positive electrode mixed material layer can be improved, and the dispersibility of the below-described conductive material can be improved to improve the output characteristics of the secondary battery.

Preferably, in the binder composition for a non-aqueous secondary battery positive electrode according to the present disclosure, a total content proportion of the conjugated diene monomer unit and the alkylene structural unit in the polymer is 40 mass % or more and 80 mass % or less. Thus, the dispersibility of the below-described conductive material can be improved to improve the output characteristics of the secondary battery.

To advantageously solve the problems stated above, a composition for a non-aqueous secondary battery positive electrode according to the present disclosure comprises the above-described binder composition for a non-aqueous secondary battery positive electrode. As a result of using the composition for a positive electrode containing the above-described binder composition for a non-aqueous secondary battery positive electrode, the balance among the paste stability of the composition for a positive electrode, the peel strength of the positive electrode mixed material layer, and the output characteristics of the secondary battery can be maintained favorably.

Preferably, the composition for a non-aqueous secondary battery positive electrode according to the present disclosure further comprises at least one of a conductive material and a positive electrode active material.

Preferably, the composition for a non-aqueous secondary battery positive electrode according to the present disclosure further comprises polyvinylidene fluoride (PVDF). Thus, the peel strength of the positive electrode mixed material layer can be improved.

To advantageously solve the problems stated above, a positive electrode for a non-aqueous secondary battery according to the present disclosure comprises a positive electrode mixed material layer formed using the above-described composition for a non-aqueous secondary battery positive electrode. As a result of using the positive electrode including the positive electrode mixed material layer formed using the above-described composition for a non-aqueous secondary battery positive electrode, a non-aqueous secondary battery having favorable output characteristics can be obtained stably.

To advantageously solve the problems stated above, a non-aqueous secondary battery according to the present disclosure comprises: the above-described positive electrode for a non-aqueous secondary battery; a negative electrode; an electrolyte solution; and a separator. As a result of using the above-described positive electrode for a non-aqueous secondary battery, favorable output characteristics can be achieved.

Advantageous Effect

It is thus possible to provide a binder composition for a non-aqueous secondary battery positive electrode and a composition for a non-aqueous secondary battery positive electrode that favorably maintain the balance among the paste stability of the composition for a positive electrode prepared using the binder composition, the peel strength of the positive electrode mixed material layer formed using the composition for a positive electrode, and the output characteristics of the secondary battery using the positive electrode including the positive electrode mixed material layer.

It is also possible to provide a positive electrode for a non-aqueous secondary battery with which a secondary battery having favorable output characteristics can be obtained.

It is further possible to provide a non-aqueous secondary battery having favorable output characteristics.

DETAILED DESCRIPTION

One of the disclosed embodiments will be described in detail below.

A binder composition for a non-aqueous secondary battery positive electrode according to the present disclosure contains a polymer and an organic solvent, and can be used when preparing a composition for a non-aqueous secondary battery positive electrode. A composition for a non-aqueous secondary battery positive electrode according to the present disclosure is a composition that contains the binder composition for a non-aqueous secondary battery positive electrode according to the present disclosure and optionally further contains a conductive material and/or a positive electrode active material, and is used as a material when preparing a positive electrode mixed material layer of a positive electrode for a non-aqueous secondary battery.

Hereafter, the term "conductive material paste for a non-aqueous secondary battery positive electrode" refers to a composition for a non-aqueous secondary battery positive electrode that contains the binder composition for a non-aqueous secondary battery positive electrode containing the polymer and the conductive material and does not contain the positive electrode active material. The term "active material paste for a non-aqueous secondary battery positive electrode" refers to a composition for a non-aqueous secondary battery positive electrode that contains the binder composition for a non-aqueous secondary battery positive electrode containing the polymer and the positive electrode active material and does not contain the conductive material. The term "slurry composition for a non-aqueous secondary battery positive electrode" refers to a composition for a non-aqueous secondary battery positive electrode that contains the binder composition for a non-aqueous secondary battery positive electrode containing the polymer, the positive electrode active material, and the conductive material.

(Binder Composition for Non-Aqueous Secondary Battery Positive Electrode)

The binder composition for a non-aqueous secondary battery positive electrode according to the present disclosure contains a predetermined polymer and an organic solvent, and may optionally contain a metal ion. The binder composition for a non-aqueous secondary battery positive electrode according to the present disclosure has solution turbidity of 1 or more and 80 or less. The binder composition for a non-aqueous secondary battery positive electrode according to the present disclosure may contain other components that can be contained in a positive electrode of a non-aqueous secondary battery, besides the foregoing components.

The binder composition for a non-aqueous secondary battery positive electrode according to the present disclosure is capable of stably forming a positive electrode with which a non-aqueous secondary battery having favorable output characteristics can be obtained.

<Solution Turbidity>

The solution turbidity of the binder composition for a non-aqueous secondary battery positive electrode is the solution turbidity in the case where the solid content concentration in the binder composition for a non-aqueous secondary battery positive electrode is 10 mass %. Factors that change the solution turbidity of the binder composition for a non-aqueous secondary battery positive electrode include the metal ion (metal salt) impurities in the binder composition for a non-aqueous secondary battery, the weight-average molecular weight of the polymer, and the gel content.

The solution turbidity is 1 or more and 80 or less. The solution turbidity is preferably 5 or more, more preferably 10 or more, and particularly preferably 20 or more, and is preferably 70 or less, more preferably 60 or less, particularly preferably 50 or less, and most preferably 40 or less. If the solution turbidity is 1 or more and 80 or less, the balance among the paste stability of the composition for a positive electrode prepared using the binder composition, the peel strength of the positive electrode mixed material layer formed using the composition for a positive electrode, and the output characteristics of the secondary battery using the positive electrode including the positive electrode mixed material layer can be maintained favorably. If the solution turbidity is 1 or more, the metal ion crosslinking effect of the polymer is sufficient, so that a decrease in the peel strength of the positive electrode mixed material layer can be prevented. If the solution turbidity is 80 or less, disruption of the balance among the paste stability of the composition for a positive electrode, the peel strength of the positive electrode mixed material layer, and the output characteristics of the secondary battery can be prevented.

<Polymer>

The polymer contained in the binder composition for a non-aqueous secondary battery positive electrode according to the present disclosure is a component that, in the positive electrode produced by forming the positive electrode mixed material layer on the current collector using the slurry composition for a non-aqueous secondary battery positive electrode prepared using the binder composition, can hold the components included in the positive electrode mixed material layer to prevent separation of these components from the positive electrode mixed material layer. When immersed in an electrolysis solution, the polymer in the positive electrode mixed material layer generally absorbs the electrolysis solution and swells while binding the positive electrode active materials to each other, binding the positive electrode active material to the conductive material, or binding the conductive materials to each other to prevent the positive electrode active material and the like from coming off the current collector.

The polymer contains a conjugated diene monomer unit and/or an alkylene structural unit and a nitrile group-containing monomer unit, and optionally further contains other repeating units. For example, the polymer is a polymer containing a conjugated diene monomer unit and a nitrile group-containing monomer unit, or a hydrogenated polymer obtained by hydrogenating the polymer. In the case where the polymer containing the conjugated diene monomer unit and the nitrile group-containing monomer unit is completely hydrogenated, the resultant polymer contains the alkylene structural unit and the nitrile group-containing monomer unit. In the case where the polymer containing the conjugated diene monomer unit and the nitrile group-containing monomer unit is partially hydrogenated, the resultant polymer contains the conjugated diene monomer unit, the alkylene structural unit, and the nitrile group-containing monomer unit.

—Conjugated Diene Monomer Unit—

Examples of conjugated diene monomers that can form the conjugated diene monomer unit include conjugated diene compounds having a carbon number of 4 or more such as 1,3-butadiene, isoprene, 2,3-dimethyl-1,3-butadiene, 2-ethyl-1,3-butadiene, and 1,3-pentadiene. Of these, isoprene and 1,3-butadiene are preferable in terms of suppressing elution into an electrolyte solution.

—Alkylene Structural Unit—

The alkylene structural unit is a repeating unit composed only of an alkylene structure expressed by the general formula: $—C_nH_{2n}—$ [where n is an integer of 2 or more]. The polymer containing the alkylene structural unit and the nitrile group-containing monomer unit can improve the dispersibility of the conductive material, when used in the preparation of the composition for a non-aqueous secondary battery positive electrode containing the conductive material.

The alkylene structural unit may be in a straight chain form or a branched form. The alkylene structural unit is preferably in a straight chain form; in other words, the alkylene structural unit is preferably a straight chain alkylene structural unit. The carbon number of the alkylene structural unit is preferably 4 or more (i.e. n in the general formula is an integer of 4 or more).

Although no specific limitations are placed on the method by which the alkylene structural unit is introduced into the polymer, the methods described below in (1) and (2) may for example be used:

(1) A method involving preparing a polymer from a monomer composition containing a conjugated diene monomer and hydrogenating the resultant polymer in order to convert the conjugated diene monomer unit to an alkylene structural unit.

(2) A method involving preparing a polymer from a monomer composition containing a 1-olefin monomer.

Of these methods, the method described in (1) is preferable in terms of ease of production of the polymer.

Thus, the alkylene structural unit is preferably a structural unit obtained through hydrogenation of a conjugated diene monomer unit (i.e., the alkylene structural unit is preferably a hydrogenated conjugated diene unit), and more preferably a structural unit obtained through hydrogenation of a 1,3-butadiene unit (i.e., the alkylene structural unit is more preferably a hydrogenated 1,3-butadiene unit).

Examples of the 1-olefin monomer include ethylene, propylene, 1-butene, and 1-hexene.

The conjugated diene monomer or the 1-olefin monomer may be one type used individually, or may be two or more types used in combination.

The total content proportion of the conjugated diene monomer unit and the alkylene structural unit in the polymer containing the conjugated diene monomer unit and/or the alkylene structural unit and the nitrile group-containing monomer unit is preferably 40 mass % or more, more preferably 45 mass % or more, further preferably 50 mass % or more, even more preferably 55 mass % or more, and particularly preferably 60 mass % or more, and is preferably 80 mass % or less, more preferably 75 mass % or less, particularly preferably 70 mass % or less, and most preferably 65 mass % or less, where the proportion of all repeating units (total of structural units and monomer units) in the polymer is taken to be 100 mass %. If the total content proportion of the conjugated diene monomer unit and the alkylene structural unit in the polymer is 40 mass % or more, a decrease in the paste stability of the composition for a positive electrode and the output characteristics of the secondary battery as a result of an increase in the non-polar skeleton in the polymer and a decrease in the adsorption of the polymer to the conductive material can be prevented. If the total content proportion of the conjugated diene monomer unit and the alkylene structural unit in the polymer is 80 mass % or less, a decrease in the paste stability of the composition for a positive electrode and the output characteristics of the secondary battery as a result of an increase in the polar skeleton in the polymer can be prevented. By limiting the total content proportion of the conjugated diene monomer unit and the alkylene structural unit in the polymer containing the conjugated diene monomer unit and/or the alkylene structural unit to a preferable range, excellent conductive material dispersibility can be displayed, which contributes to improved output characteristics of the secondary battery. In the case where the polymer containing the conjugated diene monomer unit and/or the alkylene structural unit and the nitrile group-containing monomer unit is a hydrogenated polymer obtained by hydrogenating the polymer containing the conjugated diene monomer unit and the nitrile group-containing monomer unit (i.e. in the case where the alkylene structural unit is a hydrogenated conjugated diene unit), the proportion of the conjugated diene monomer unit in the polymer containing the conjugated diene monomer unit and the nitrile group-containing monomer unit before hydrogenation is preferably 40 mass % or more, more preferably 45 mass % or more, further preferably 50 mass % or more, even more preferably 55 mass % or more, and particularly preferably 60 mass % or more, and is preferably 80 mass % or less, more preferably 75 mass % or less, particularly preferably 70 mass % or less, and most preferably 65 mass % or less, where the proportion of all repeating units in the polymer is taken to be 100 mass %. If the proportion of the conjugated diene monomer unit is 40 mass % or more, a decrease in the paste stability of the composition for a positive electrode and the output characteristics of the secondary battery as a result of an increase in the non-polar skeleton in the hydrogenated polymer obtained by hydrogenating the polymer and a decrease in the adsorption of the polymer to the conductive material can be prevented. If the proportion of the conjugated diene monomer unit is 80 mass % or less, a decrease in the peel strength of the positive electrode mixed material layer and the output characteristics of the secondary battery as a result of an increase in the polar skeleton in the hydrogenated polymer can be prevented.

—Nitrile Group-Containing Monomer Unit—

Examples of nitrile group-containing monomers that can form the nitrile group-containing monomer unit include an α,β-ethylenically unsaturated nitrile monomer. The α,β-ethylenically unsaturated nitrile monomer is not specifically limited other than being an α,β-ethylenically unsaturated compound that has a nitrile group, and may for example be acrylonitrile; an α-halogenoacrylonitrile such as α-chloroacrylonitrile or α-bromoacrylonitrile; or an α-alkylacrylonitrile such as methacrylonitrile or α-ethylacrylonitrile. Of these monomers, the nitrile group-containing monomer is preferably acrylonitrile or methacrylonitrile, and is more preferably acrylonitrile.

Any one of such nitrile group-containing monomers may be used individually, or any two or more of such nitrile group-containing monomers may be used in combination.

The proportion of the nitrile group-containing monomer unit in the polymer containing the conjugated diene monomer unit and/or the alkylene structural unit and the nitrile group-containing monomer unit is preferably 20 mass % or more, more preferably 25 mass % or more, particularly preferably 30 mass % or more, and most preferably 35 mass % or more, and is preferably 60 mass % or less, more preferably 55 mass % or less, further preferably 50 mass % or less, particularly preferably 45 mass % or less, and most preferably 40 mass % or less. If the proportion of the nitrile group-containing monomer unit is 20 mass % or more, a decrease in the peel strength of the positive electrode mixed material layer and the output characteristics of the secondary battery as a result of an increase in the polar skeleton in the polymer can be prevented. If the proportion of the nitrile group-containing monomer unit is 60 mass % or less, a decrease in the peel strength of the positive electrode mixed material layer and the output characteristics of the secondary battery as a result of an increase in the non-polar skeleton in the polymer and a decrease in the adsorption of the polymer to the conductive material can be prevented. By limiting the proportion of the nitrile group-containing monomer unit to the preferable range, excellent conductive material dispersibility can be displayed, which contributes to improved peel strength of the positive electrode mixed material layer and output characteristics of the secondary battery.

—Other Repeating Units—

Examples of monomers (hereinafter, also referred to as "other monomers") that can form other repeating units include, but are not limited to, (meth)acrylic acid ester monomers; styrene (St) monomers; and hydrophilic group-containing polymerizable monomers. As the other monomers, a (meth)acrylic acid ester monomer is preferably used. That is, the polymer preferably contains a (meth)acrylic acid ester monomer unit.

One of such monomers may be used individually, or two or more of such monomers may be used in combination. In the present disclosure, "(meth)acryl" is used to indicate "acryl" and/or "methacryl".

Examples of (meth)acrylic acid ester monomers include: acrylic acid alkyl esters, such as methyl acrylate, ethyl acrylate (EA), n-propyl acrylate, isopropyl acrylate, n-butyl acrylate (BA), t-butyl acrylate, isobutyl acrylate, n-pentyl acrylate, isopentyl acrylate, hexyl acrylate, heptyl acrylate, octyl acrylate, 2-ethylhexyl acrylate (2EHA), nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these, as the (meth)acrylic acid ester monomer, ethyl acrylate (EA), n-butyl acrylate (BA), and 2-ethylhexyl acrylate (2EHA) are preferable, and n-butyl acrylate (BA) is more preferable.

Examples of hydrophilic group-containing polymerizable monomers include monomers having a carboxylic acid group, monomers having a sulfonate group, monomers having a phosphate group, and monomers having a hydroxyl group. In terms of enhancing the binding capacity of the polymer, the hydrophilic group is preferably a carboxylic acid group or a sulfonate group, and more preferably a carboxylic acid group.

Examples of monomers having a carboxylic acid group include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of monocarboxylic acid derivatives include 2-ethylacrylic acid, isocrotonic acid, α-acetoxy acrylic acid, β-trans-aryloxy acrylic acid, α-chloro-β-E-methoxy acrylic acid, and β-diamino acrylic acid.

Examples of dicarboxylic acids include maleic acid, fumaric acid, and itaconic acid.

Examples of derivatives of dicarboxylic acids include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic acid anhydride, methyl maleic anhydride, and dimethyl maleic anhydride.

Furthermore, an acid anhydride that produces a carboxyl group upon hydrolysis can also be used as a monomer having a carboxylic acid group.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of monomers having a sulfonate group include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of monomers having a phosphate group include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of monomers having a hydroxyl group include: ethylenic unsaturated alcohol, such as (meth)allyl alcohol, 3-butene-1-ol, and 5-hexene-1-ol; alkanol esters of ethylenic unsaturated carboxylic acid, such as 2-hydroxyethyl-acrylate, 2-hydroxypropyl-acrylate, 2-hydroxyethyl-methacrylate, 2-hydroxypropyl-methacrylate, di-2-hydroxyethyl-maleate, di-4-hydroxybutyl maleate, and di-2-hydroxypropyl itaconate; esters of (meth)acrylic acid and polyalkylene glycol represented by the general formula $CH_2{=}CR^1{-}COO{-}(C_nH_{2n}O)_m{-}H$ (where m represents an integer from 2 to 9, n represents an integer from 2 to 4, and R1 represents hydrogen or a methyl group); mono(meth)acrylic acid esters of dihydroxy ester of dicarboxylic acid, such as 2-hydroxyethyl-2'-(meth)acryloyl oxyphthalate and 2-hydroxyethyl-2'-(meth)acryloyl oxysuccinate; vinyl ethers, such as 2-hydroxyethyl vinyl ether and 2-hydroxypropyl vinyl ether; mono(meth)allyl ethers of alkylene glycol, such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers, such as diethylene glycol mono(meth)allyl ether and dipropylene glycol mono(meth)allyl ether; glycerin mono(meth)allyl ether; mono(meth)allyl ether of halogen or hydroxy substitution of (poly)alkylene glycol, such as (meth)allyl-2-chloro-3-hydroxypropyl ether and (meth)allyl-2-hydroxy-3-chloropropyl ether; mono(meth)allyl ether of polyhydric phenol, such as eugenol and isoeugenol, and a halogen substitution thereof; and (meth)allyl thioethers of alkylene glycol, such as (meth)allyl-2-hydroxyethyl thioether and (meth)allyl-2-hydroxypropyl thioether.

The proportion of the other repeating units in the polymer containing the conjugated diene monomer unit and/or the alkylene structural unit and the nitrile group-containing monomer unit is preferably 10 mass % or less. If the proportion of the other repeating units is 10 mass % or less, the polymer is prevented from swelling excessively in an electrolyte solution while enhancing the plasticity of the polymer, so that the life characteristics of the non-aqueous secondary battery can be improved.

—Preparation Method for Polymer—

The method of producing the above-described polymer is not limited. For example, any of solution polymerization, suspension polymerization, bulk polymerization, and emulsion polymerization may be used.

The polymerization method may be, for example, addition polymerization such as ionic polymerization, radical polymerization, or living radical polymerization. As a polymerization initiator, a known polymerization initiator such as a redox polymerization initiator containing a ferrous compound may be used.

In the case of producing the above-described polymer by the method (1), the polymerization method for the polymer that is hydrogenated is preferably radical polymerization using a redox polymerization initiator containing a ferrous compound. As the redox polymerization initiator, for example, a combination of cumene hydroperoxide, ferric sodium ethylenediaminetetraacetate, sodium hydroxymethanesulfinate, and tetrasodium ethylenediamine tetraacetate (EDTA.4Na) may be used, without being limited thereto. In the case of producing the above-described polymer by the method (1), it is preferable to, after emulsion polymerization, coagulate the polymer using a coagulant and collect it, and hydrogenate the collected polymer (after the below-described "metathesis reaction" is optionally performed).

The hydrogenation may be performed by a known hydrogenation method such as an oil-layer hydrogenation method or a water-layer hydrogenation method. The catalyst used in the hydrogenation may be any selective hydrogenation catalyst publicly known. Examples of the catalyst that can be used include a palladium-based catalyst and a rhodium-based catalyst. Two or more of such catalysts may be used in combination.

The hydrogenation of the polymer may be performed using, for example, the method described in JP 4509792 B2. Specifically, the hydrogenation of the polymer may be performed after subjecting the polymer to metathesis reaction in the presence of a catalyst and a co-olefin.

As the catalyst in the metathesis reaction, a known ruthenium-based catalyst may be used. In particular, as the catalyst in the metathesis reaction, Grubbs catalysts such as bis(tricyclohexylphosphine)benzylideneruthenium dichloride and 1,3-bis(2,4,6-trimethylphenyl)-2-(imidazolidinylidene)(dichlorophenylmethylene)(tricyclohexylphosphine)ruthenium are preferable. As the co-olefin, an olefin having a carbon number of 2 to 16 such as ethylene, isobutane, or 1-hexane may be used. As the hydrogenation catalyst in the case of performing the hydrogenation after the metathesis reaction, for example, a known homogeneous hydrogenation catalyst such as Wilkinson catalyst ($(PPh_3)_3RhCl$) may be used.

—Properties of Polymer—

The iodine value of the polymer containing the conjugated diene monomer unit and/or the alkylene structural unit and the nitrile group-containing monomer unit is preferably 0.01 mg/100 mg or more, more preferably 1 mg/100 mg or more, and particularly preferably 5 mg/100 mg or more, and is preferably 65 mg/100 mg or less, more preferably 40 mg/100 mg or less, further preferably 30 mg/100 mg or less, even more preferably 20 mg/100 mg or less, and particularly preferably 10 mg/100 mg or less. If the iodine value of the polymer is 0.01 mg/100 mg or more, a decrease in the peel strength of the positive electrode mixed material layer as a result of a decrease in the rigidity of the polymer can be prevented. If the iodine value of the polymer is 65 mg/100 mg or less, a decrease in the paste stability of the composition for a positive electrode and the output characteristics of the secondary battery as a result of a decrease in the dispersibility of the conductive material can be prevented. By limiting the iodine value of the polymer to the preferable range, the dispersibility of the below-described conductive material can be improved to improve the output characteristics of the secondary battery.

<Organic Solvent>

Examples of the organic solvent include organic solvents such as N-methylpyrrolidone (NMP), N,N-dimethylformamide, and acetone. Of these, N-methylpyrrolidone (NMP) is preferable in terms of resin solubility and positive electrode slurry stability.

<Metal Ion>

Examples of the metal ion in the binder composition include aluminum ion, calcium ion, magnesium ion, potassium ion, and ferrous ion. Of these, aluminum ion, calcium ion, and magnesium ion are preferable in terms of suppressing formation of a metal salt with a residue in polymerization.

The concentration of the metal ion selected from the group consisting of aluminum ion, calcium ion, and magnesium ion in the binder composition is preferably 50 mass ppm or more, more preferably 250 mass ppm or more, particularly preferably 500 mass ppm or more, and most preferably 1000 mass ppm or more, and is preferably 4000 mass ppm or less, more preferably 3500 mass ppm or less, further preferably 3000 mass ppm or less, even more preferably 2500 mass ppm or less, and particularly preferably 2000 mass ppm or less. If the metal ion concentration in the binder composition is 50 mass ppm or more and 4000 mass ppm or less, the balance among the paste stability of the composition for a positive electrode, the peel strength of the positive electrode mixed material layer, and the output characteristics of the secondary battery can be maintained favorably. If the metal ion concentration in the binder composition is 50 mass ppm or more, a decrease in the peel strength of the positive electrode mixed material layer as a result of a failure to achieve the metal ion crosslinking effect of the polymer can be prevented. If the metal ion concentration in the binder composition is 4000 mass ppm or less, a decrease in the paste stability of the composition for a positive electrode, the peel strength of the positive electrode mixed material layer, and the output characteristics of the secondary battery as a result of an increase in the amount of metal salt present at the interface between the active material and the conductive material can be prevented. The concentration (content) of the metal ion can be adjusted by removing metal salt through filtration/decantation.

The metal ion such as aluminum ion, calcium ion, and magnesium ion in the binder composition derives from a coagulant added in the preparation of the polymer. Examples of the coagulant added in the preparation of the polymer include magnesium sulfate, calcium chloride, aluminum sulfate, potassium chloride, iron sulfate (II), iron sulfate (III), iron chloride (II), and iron chloride (III). Of these, magnesium sulfate, calcium chloride, and aluminum sulfate are preferable in terms of favorably coagulating the polymer and suppressing formation of a metal salt with a residue in polymerization.

Examples of the method of removing metal salt through filtration/decantation include (i) a method of capturing metal salt by filtration using a bag filter, a cartridge filter, a paper filter, a membrane filter, or the like; (ii) a method of capturing metal salt by forming a cake layer of a filter aid such as diatomite or pearlite and then causing a filtrate to flow, using a filter such as a leaf filter, a filter press, a candle filter, or a drum filter; and (iii) a method of removing metal salt by precipitating metal salt through centrifugal separation and then removing it from the bottom.

<Other Components>

In addition to the components described above, the binder composition for a non-aqueous secondary battery positive electrode according to the present disclosure may contain other components such as a reinforcing material, a leveling agent, a viscosity modifier, or an additive for electrolysis solution. The other components may be any commonly known materials that do not affect the battery reaction. For example, components described in WO 2012/115096 A1 may be used. One of these components may be used individually, or two or more of these components may be used in combination in a freely selected ratio.

<Preparation of Binder Composition for Non-Aqueous Secondary Battery Positive Electrode>

The binder composition for a non-aqueous secondary battery positive electrode according to the present disclosure can be prepared by dissolving or dispersing the above-described components in a solvent such as an organic solvent. Specifically, the above-described components and the solvent may be mixed using a mixer such as a ball mill, a sand mill, a bead mill, a pigment disperser, a grinding machine, an ultrasonic disperser, a homogenizer, a planetary mixer, or a FILMIX to prepare the binder composition for a non-aqueous secondary battery positive electrode.

In the case where the polymer used is prepared as an aqueous dispersion, the binder composition may be obtained by coagulating the polymer with the coagulant, then removing water, and then mixing the result with the organic solvent. Alternatively, the binder composition for a non-aqueous secondary battery positive electrode may be obtained by mixing the aqueous dispersion of the polymer and the organic solvent and then removing water.

(Composition for Non-Aqueous Secondary Battery Positive Electrode)

The composition for a non-aqueous secondary battery positive electrode according to the present disclosure contains the binder composition containing the polymer. That is, the composition for a non-aqueous secondary battery positive electrode according to the present disclosure contains the polymer and the organic solvent, and optionally further contains the conductive material, the metal ion, the positive electrode active material, and other components. The composition for a non-aqueous secondary battery positive electrode according to the present disclosure can be used to form a positive electrode with which a non-aqueous secondary battery having favorable output characteristics can be obtained.

<Binder Composition>

As the binder composition, the above-described binder composition for a non-aqueous secondary battery positive electrode according to the present disclosure is used.

<Conductive Material>

The conductive material ensures electrical contact within the positive electrode active material. Examples of conductive materials that can be used include conductive carbon materials such as carbon black (e.g. acetylene black, Ketjen Black® (Ketjen black is a registered trademark in Japan, other countries, or both), furnace black), graphite (graphene), carbon fibers (carbon nanofibers), carbon flakes, carbon nanofibers (such as carbon nanotubes (CNTs) and vapor-grown carbon fibers); and various metal fibers or foil.

Of these, in terms of conductivity and output characteristics, carbon black, Ketjen Black®, carbon fibers (carbon nanofibers), graphite (graphene), and carbon nanotubes (CNTs) are preferable, Ketjen Black® and carbon nanotubes (CNTs) are more preferable, and carbon nanotubes (CNTs) are particularly preferable.

Any one of such conductive materials may be used individually, or any two or more of such conductive materials may be used in combination.

The blending amount of the conductive material per 100 parts by mass of the below-described positive electrode active material is preferably 0.5 parts by mass or more and more preferably 1.0 parts by mass or more, and is preferably 5.0 parts by mass or less and more preferably 4.5 parts by mass or less. If the blending amount of the conductive material is 0.5 parts by mass or more, electrical contact within the positive electrode active material can be ensured sufficiently. If the blending amount of the conductive material is 5.0 parts by mass or less, a decrease in the viscosity stability of the composition for a non-aqueous secondary battery positive electrode can be prevented, and a failure to sufficiently increase the capacity of the secondary battery as a result of a decrease in the density of the positive electrode mixed material layer in the positive electrode can be prevented.

The specific surface area of the conductive material is preferably 100 $m^2/g$ or more, more preferably 150 $m^2/g$ or more, particularly preferably 200 $m^2/g$ or more, and most preferably 300 $m^2/g$ or more, and is preferably 1000 $m^2/g$ or less, more preferably 800 $m^2/g$ or less, and particularly preferably 500 $m^2/g$ or less. If the specific surface area of the conductive material is in the foregoing range, excellent conductivity is achieved, which contributes to improved output characteristics of the secondary battery. If the specific surface area of the conductive material is 100 $m^2/g$ or more, a decrease in the output characteristics of the secondary battery as a result of insufficient network formation of the conductive material can be prevented. If the specific surface area of the conductive material is 1000 $m^2/g$ or less, a decrease in the paste stability of the composition for a positive electrode, the peel strength of the positive electrode mixed material layer, and the output characteristics of the secondary battery as a result of the dispersion of the conductive material being difficult and an aggregate forming can be prevented.

<Positive Electrode Active Material>

The positive electrode active material is a material that gives and receives electrons in the positive electrode of the secondary battery. As the positive electrode active material for a lithium ion secondary battery, for example, a material that can occlude and release lithium is usually used.

The following will describe a positive electrode active material in the case where the non-aqueous secondary battery is a lithium ion secondary battery as an example, although the present disclosure is not limited to the following example.

Specific examples of the positive electrode active material for a lithium ion secondary battery include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$ (lithium cobalt oxide)), lithium-containing nickel oxide ($LiNiO_2$), lithium-containing composite oxide of Co—Ni—Mn (Li(Co Mn Ni)$O_2$), lithium-containing composite oxide of Ni—Mn—Al, lithium-containing composite oxide of Ni—Co—Al, and a solid solution comprising $LiMaO_2$ and $Li_2MbO_3$. Examples of the lithium-containing composite oxide of Co—Ni—Mn include $Li[Ni_{0.5}Co_{0.2}Mn_{0.3}]O_2$ and $Li[Ni_{1/3}Co_{1/3}Mn_{1/3}]O_2$. Examples of the solid solution comprising $LiMaO_2$ and $Li_2MbO_3$ include $xLiMaO_2\cdot(1-x)Li_2MbO_3$, where x represents a number satisfying $0<x<1$, Ma represents one or more kinds of transition metals with an average oxidation state of 3+, and Mb represents one or more kinds of transition metals with an average oxidation state of 4+. Examples of such a solid solution include $Li[Ni_{0.17}Li_{0.2}Co_{0.07}Mn_{0.56}]O_2$.

The term "average oxidation state" as used herein refers to an average oxidation state of the "one or more kinds of transition metals" and is calculated from the molar quantity and the valence of the transition metal. For example, in a situation in which the "one or more kinds of transition metals" is made up of 50 mol % of $Ni^{2+}$ and 50 mol % of $Mn^{4+}$, the average oxidation state of the "one or more kinds of transition metals" is $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example is $Li_s[Mn_{2-t}Mc_t]O_4$ such as $LiNi_{0.5}Mn_{1.5}O_4$, where Mc represents one or more kinds of transition metals having an average oxidation state of 4+, which may be Ni, Co, Fe, Cu, or Cr; t represents a number satisfying 0<t<1; and s represents a number satisfying 0 s 1. Another example of the positive electrode active material is lithium-rich spinel compounds represented by $Li_{1+x}Mn_{2-x}O_4$ (0<X<2).

Examples of the lithium-containing composite metal oxide with an olivine structure include olivine-type lithium phosphate compounds represented by the formula $Li_yMdPO_4$ such as olivine-type lithium iron phosphate ($LiFePO_4$) and olivine-type manganese lithium phosphate ($LiMnPO_4$), where Md represents one or more kinds of transition metals having an average oxidation state of 3+, which may be Mn, Fe, or Co, and y represents a number satisfying 0≤y≤2. Md of the olivine-type lithium phosphate compounds represented by the formula $LiyMdPO_4$ may be partly substituted with another metal. Examples of the metal possibly substituting the part of Md include Cu, Mg, Zn, V, Ca, Sr, Ba, Ti, Al, Si, B, and Mo.

Of these, in terms of enabling high potential of the lithium ion secondary battery, the positive electrode active material is preferably lithium-containing cobalt oxide ($LiCoO_2$), lithium-containing composite oxide of Co—Ni—Mn (Li(Co Mn Ni)$O_2$), a solid solution of $LiMaO_2$ and $Li_2MbO_3$, $Li[Ni_{0.5}Co_{0.2}Mn_{0.3}]O_2$, $Li[Ni_{1/3}Co_{1/3}Mn_{1/3}]O_2$, $LiNi_{0.5}Mn_{1/5}O_4$, or the like.

<Other Components>

Other components that may be contained in the composition for a non-aqueous secondary battery positive electrode are not limited, and may be a binder (or binders) other than the above-described polymer and the same components as the other components that may be contained in the binder composition for a non-aqueous secondary battery positive electrode according to the present disclosure. One other component may be used individually, or two or more other components may be used in combination in a freely selected ratio.

<<Binder>>

Examples of the binder include a fluorine-containing polymer such as polyvinylidene fluoride (PVDF), polymethyl methacrylate (PMMA), polyacrylonitrile (PAN), and other acryl copolymers. Of these, in terms of excellent peel strength of the positive electrode mixed material layer, polyvinylidene fluoride (PVDF) and polyacrylonitrile (PAN) are preferable, and polyvinylidene fluoride (PVDF) is more preferable.

The blending amount of the binder per 100 parts by mass of the total of the polymer and the binder in the binder composition for a non-aqueous secondary battery positive electrode according to the present disclosure is preferably 1 part by mass or more, more preferably 3 parts by mass or more, further preferably 5 parts by mass or more, even more preferably 30 parts by mass or more, particularly preferably 50 parts by mass or more, and most preferably 70 parts by mass or more, and is preferably 99 parts by mass or less, more preferably 97 parts by mass or less, further preferably 95 parts by mass or less, even more preferably 90 parts by mass or less, particularly preferably 85 parts by mass or less, and most preferably 80 parts by mass or less. If the blending amount of the binder is in the foregoing range, excellent conductivity is achieved, which contributes to improved output characteristics of the secondary battery. Moreover, excellent peel strength of the positive electrode mixed material layer is achieved. If the blending amount of the binder is 1 part by mass or more, a decrease in the peel strength of the positive electrode mixed material layer as a result of a decrease in the crystallinity of the polymer in the binder composition can be prevented. If the blending amount of the binder is 99 parts by mass or less, a decrease in the paste stability of the composition for a positive electrode, the peel strength of the positive electrode mixed material layer, and the output characteristics of the secondary battery as a result of the dispersion of the conductive material being difficult and an aggregate forming can be prevented.

<Production Method for Composition for Non-Aqueous Secondary Battery Positive Electrode>

The above-described composition for a non-aqueous secondary battery positive electrode can be prepared by dissolving or dispersing the above-described components in a solvent such as an organic solvent. For example, the above-described components and the solvent may be mixed using a mixer such as a ball mill, a sand mill, a bead mill, a pigment disperser, a grinding machine, an ultrasonic disperser, a homogenizer, a planetary mixer, or a FILMIX to prepare the composition for a non-aqueous secondary battery positive electrode.

The following will describe a production method for the composition for a non-aqueous secondary battery positive electrode containing the binder composition for a non-aqueous secondary battery positive electrode according to the present disclosure in each of the case where the composition is a conductive material paste for a non-aqueous secondary battery positive electrode, the case where the composition is an active material paste for a non-aqueous secondary battery positive electrode, and the case where the composition is a slurry composition for a non-aqueous secondary battery positive electrode.

<<Production Method for Conductive Material Paste for Non-Aqueous Secondary Battery Positive Electrode>>

In the case where the composition for a non-aqueous secondary battery positive electrode is a conductive material paste for a non-aqueous secondary battery positive electrode, the conductive material paste can be prepared by mixing the above-described binder composition, the conductive material, optional other components such as a binder, and the organic solvent. The order in which the components are mixed when preparing the conductive material paste for a non-aqueous secondary battery positive electrode is not limited, but it is preferable to mix the conductive material and the binder composition and then mix them with the remaining components, or simultaneously mix all of the components.

<<Production Method for Active Material Paste for Non-Aqueous Secondary Battery Positive Electrode>>

In the case where the composition for a non-aqueous secondary battery positive electrode is an active material paste for a non-aqueous secondary battery positive electrode, the active material paste can be prepared by mixing the above-described binder composition, the positive electrode active material, optional other components such as a binder, and the organic solvent. The order in which the components are mixed when preparing the active material paste for a non-aqueous secondary battery positive electrode is not limited, but it is preferable to mix the positive electrode active material and the binder composition and then mix them with the remaining components, or simultaneously mix all of the components.

<<Production Method for Slurry Composition for Non-Aqueous Secondary Battery Positive Electrode>>

In the case where the composition for a non-aqueous secondary battery positive electrode is a slurry composition for a non-aqueous secondary battery positive electrode, the slurry composition can be prepared by mixing the above-described binder composition, the positive electrode active material, the conductive material, optional other components such as a binder, and the organic solvent. The order in which the components are mixed when preparing the slurry composition for a non-aqueous secondary battery positive electrode is not limited. The above-described conductive material paste for a non-aqueous secondary battery positive electrode may be prepared first, and then mixed with the positive electrode active material. Alternatively, all of the components may be mixed simultaneously. By adding a binder such as PDVF to the slurry composition for a non-aqueous secondary battery positive electrode, the peel strength of the composition for a positive electrode can be improved.

(Positive Electrode for Non-Aqueous Secondary Battery)

The positive electrode for a non-aqueous secondary battery according to the present disclosure includes, for example, a current collector and a positive electrode mixed material layer formed on the current collector, wherein the positive electrode mixed material layer is formed using the slurry composition for a non-aqueous secondary battery positive electrode (the composition for a non-aqueous secondary battery positive electrode according to the present disclosure containing the conductive material and the positive electrode active material). That is, the positive electrode mixed material layer contains at least the conductive material, the positive electrode active material, and the polymer. In addition, the positive electrode mixed material layer optionally contains the metal salt (metal ion) and other components such as a binder. Components contained in the positive electrode mixed material layer are the same as the components contained in the above-described slurry composition for a non-aqueous secondary battery positive electrode. The suitable ratios of these components in the positive electrode mixed material layer are the same as the suitable ratios of these components in the slurry composition.

The positive electrode for a non-aqueous secondary battery according to the present disclosure is produced using the slurry composition containing the binder composition for a non-aqueous secondary battery positive electrode according to the present disclosure, and therefore a non-aqueous secondary battery having favorable output characteristics can be obtained using the positive electrode.

<Production Method for Positive Electrode for Non-Aqueous Secondary Battery Positive Electrode>

The positive electrode for a non-aqueous secondary battery according to the present disclosure is produced, for example, through a step of applying the above-described slurry composition for a non-aqueous secondary battery positive electrode onto the current collector (application step) and a step of drying the slurry composition that has been applied onto the current collector to form a positive electrode mixed material layer on the current collector (drying step).

The positive electrode for a non-aqueous secondary battery according to the present disclosure may also be produced by a method in which composite particles are prepared through dry granulation of the above-described slurry composition for a non-aqueous secondary battery positive electrode and are used to form a positive electrode mixed material layer on the current collector.

[Application Step]

The slurry composition for a non-aqueous secondary battery positive electrode can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition for a non-aqueous secondary battery positive electrode may be applied onto one side or both sides of the current collector. The thickness of the slurry coating on the current collector after application but before drying may be set as appropriate in accordance with the thickness of the positive electrode mixed material layer to be obtained after drying.

The current collector onto which the slurry composition for a non-aqueous secondary battery positive electrode is applied is a material having electrical conductivity and electrochemical durability. Specifically, the current collector may, for example, be made of iron, copper, aluminum, nickel, stainless steel, titanium, tantalum, gold, platinum, or the like. Of these, aluminum foil is particularly preferable as the current collector used for the positive electrode. One of these materials may be used individually, or two or more of these materials may be used in combination in a freely selected ratio.

[Drying Step]

The slurry composition for a non-aqueous secondary battery positive electrode that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition for a non-aqueous secondary battery positive electrode on the current collector as described above, the positive electrode mixed material layer is formed on the current collector, thereby providing a positive electrode for a non-aqueous secondary battery that includes the current collector and the positive electrode mixed material layer.

In the production method for the positive electrode for a non-aqueous secondary battery according to the present disclosure, after the drying step, the positive electrode mixed material layer may be further subjected to pressing treatment, such as mold pressing or roll pressing. The pressing treatment can improve the close adherence between the positive electrode mixed material layer and the current collector.

Furthermore, when the positive electrode mixed material layer contains a curable polymer, the polymer is preferably cured after the positive electrode mixed material layer has been formed.

(Non-Aqueous Secondary Battery)

The non-aqueous secondary battery according to the present disclosure includes a positive electrode, a negative electrode, an electrolyte solution, and a separator, wherein the positive electrode is the positive electrode for a non-aqueous secondary battery according to the present disclosure. The non-aqueous secondary battery according to the present disclosure includes the positive electrode for a non-aqueous secondary battery according to the present disclosure, and thus has favorable output characteristics.

The following will describe an example in which the non-aqueous secondary battery is a lithium ion secondary battery, although the present disclosure is not limited to the following example.

<Negative Electrode>

The negative electrode may be any known negative electrode. Specifically, the negative electrode may for example be a negative electrode formed by a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binder. The binder is not specifically limited and may be freely selected from known materials.

<Electrolysis Solution>

The electrolysis solution is normally an organic electrolysis solution in which a supporting electrolyte is dissolved in an organic solvent. For example, a supporting electrolyte is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. The electrolyte may be one type used individually, or may be two or more types combined in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of organic solvents that can be used include: carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region.

A mixture of ethylene carbonate and ethyl methyl carbonate is further preferable.

The concentration of the electrolyte in the electrolysis solution can be adjusted as needed. For example, the concentration is preferably 0.5 mass % to 15 mass %, more preferably 2 mass % to 13 mass %, and further preferably 5 mass % to 10 mass %.

<Separator>

Examples of the separator include, but are not specifically limited to, separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of the electrode active material in the secondary battery, and consequently increases the capacity per unit volume.

(Production Method for Non-Aqueous Secondary Battery)

The non-aqueous secondary battery according to the present disclosure can be produced, for example, through a step of assembling the non-aqueous secondary battery including the positive electrode for a non-aqueous secondary battery according to the present disclosure, the negative electrode, the electrolyte solution, and the separator (assembly step) and a step of subjecting the assembled non-aqueous secondary battery to aging treatment (aging step).

<Assembly Step>

In the assembly step, the non-aqueous secondary battery is assembled, for example, by stacking the positive electrode and the negative electrode with the separator in-between, rolling or folding the resultant stack as necessary in accordance with the battery shape to place the stack in a battery vessel, filling the battery vessel with the electrolysis solution, and sealing the battery vessel. In order to prevent pressure increase inside the non-aqueous secondary battery and occurrence of overcharging or overdischarging, an overcurrent preventing device such as a PTC device or a fuse; an expanded metal; or a lead plate may be provided as necessary. The shape of the non-aqueous secondary battery assembled may for example be a coin type, button type, sheet type, cylinder type, prismatic type, or flat type.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to evaluate the metal ion concentration in the binder composition, the iodine value of the hydrogenated polymer, the solution turbidity of the binder composition, the paste stability, the peel strength, and the output characteristics.

<Metal Ion Concentration in Binder Composition>

About 1 g of the binder composition was collected, and incinerated for about 3 hours in an electric furnace of 550° C. Subsequently, about 5 mL of concentrated sulfuric acid was added and dissolved, and about 5 mL of concentrated nitric acid was gradually added to perform wet digestion.

After the digestion, the acid was concentrated, and the volume was adjusted to a fixed volume of 10 mL using ultrapure water. The metal ion concentration in the binder composition was then measured using ICP-AES (model: SPS-5100, SII NanoTechnology Inc.). The results are shown in Table 1.

<Iodine Value>

100 g of an N-methylpyrrolidone (NMP) solution of the hydrogenated polymer was coagulated with 1 L of methanol, and then vacuum dried overnight at a temperature of 60° C. For the dried hydrogenated polymer, the iodine value was measured in accordance with JIS K6235 (2006). The results are shown in Table 1.

<Solution Turbidity of Binder Composition>

After calibration with a standard solution (produced by Kasahara Chemical Instruments Corp.) of miscible polystyrene standard turbidity of 10 degrees and 100 degrees, 10 mL of the binder composition was collected and the turbidity was measured with n=3 and averaged, using a turbidity meter TR-55 (produced by Kasahara Chemical Instruments Corp.). The concentration of the solid content (polymer and coagulant) in the binder composition in the solution turbidity measurement was 10 mass %. The results are shown in Table 1.

<Paste Stability>

The produced slurry was kept still without stirring. After 7 days, whether precipitation occurred was checked, and the paste stability was evaluated based on the following evaluation criteria. The results are shown in Table 1.

<<Evaluation Criteria>>

A: No precipitation.

B: Precipitation occurred. As a result of redispersion by stirring, the viscosity recovered to a range of 80% or more and 100% or less of the initial viscosity.

C: Precipitation occurred. As a result of redispersion by stirring, the viscosity recovered to a range of 60% or more and less than 80% of the initial viscosity.

D: Precipitation occurred. As a result of redispersion by stirring, the viscosity recovered to a range of less than 60% of the initial viscosity.

<Peel Strength>

A test piece having a rectangular shape of 100 mm in length and 10 mm in width was cut out from the produced electrode for a lithium ion secondary battery. Cellophane tape was attached to the surface of the electrode mixed material layer with the surface on which the electrode mixed material layer was formed facing downward. Thereafter, one end of the current collector was pulled vertically upward at a pulling rate of 300 mm/minute to peel off the current collector while measuring stress during the peeling (note that the cellophane tape was fixed to a test bed). This measurement was performed three times to obtain an average value. The average value was taken to be the peel strength and was evaluated based on the following criteria. A larger value of the peel strength indicates better close adherence between the electrode mixed material layer and the current collector. The results are shown in Table 1. A higher peel strength is more preferable.

<<Evaluation Criteria>>

A: Peel strength of 25 N/m or more.

B: Peel strength of 20 N/m or more and less than 25 N/m.

C: Peel strength of 15 N/m or more and less than 20 N/m.

D: Peel strength of less than 15 N/m.

<Output Characteristics>

The laminated cell produced in each of the examples and comparative examples was charged to a state of charge (SOC) of 50% with a constant current of 0.1 C at 25° C., and voltage V1 was measured. Subsequently, the laminated cell was discharged for 15 seconds with a constant current of 2 C at 25° C., and voltage V2 was measured. From the measurement results, voltage drop $\Delta V=V1-V2$ was calculated. The calculated voltage drop $\Delta V$ was evaluated based on the following evaluation criteria. The results are shown in Table 1. A smaller value of the voltage drop $\Delta V$ indicates better output characteristics.

<<Evaluation Criteria>>

A: Voltage drop $\Delta V$ of less than 210 mV.

B: Voltage drop $\Delta V$ of 210 mV or more and less than 240 mV.

C: Voltage drop $\Delta V$ of 240 mV or more and less than 270 mV.

D: Voltage drop $\Delta V$ of 270 mV or more.

Example 1

[Preparation of Hydrogenated Polymer]

—Preparation of Polymer—

In a metal bottle, 0.2 parts of sodium carbonate was dissolved in 200 parts of deionized water. 2.5 parts of potassium decanoate (soap of a fatty acid with a carbon number of 10) was added into the metal bottle as an emulsifier. Further, an aqueous solution containing 1.0 part of naphthalene-sulfonic acid formaldehyde polycondensate was added as a dispersant. Subsequently, 35 parts of acrylonitrile as a nitrile group-containing monomer and 0.5 parts of t-dodecyl mercaptan as a molecular weight modifier were added into the metal bottle in sequence. After purging gas inside the metal bottle with nitrogen three times, 65 parts of 1,3-butadiene was added as a conjugated diene monomer. The metal bottle was maintained at 5° C., and a redox polymerization initiator obtained by combining 0.1 parts of cumene hydroperoxide, 0.01 parts of ferric sodium ethylenediaminetetraacetate hydrate, 0.03 parts of sodium hydroxymethanesulfinate dihydrate, and 0.02 parts of $EDTA\cdot 4Na\cdot 4H_2O$ was added. While maintaining the temperature at 5° C., polymerization reaction was performed for 16 hours. After reaching a degree of polymerization of 90%, 0.1 parts of hydroxylamine sulfate and 0.03 parts of diethylhydroxylamine were added as polymerization terminators to terminate the polymerization reaction. Thereafter, a rotary evaporator having a water temperature of 60° C. was used to remove residual monomers and thereby obtain a latex of a polymer (nitrile rubber) containing a conjugated diene monomer unit and a nitrile group-containing monomer unit. The composition of the nitrile rubber contained 35 mass % of an acrylonitrile monomer unit and 65 mass % of a 1,3-butadiene monomer unit, and the latex concentration was 25 mass %.

Part of the obtained latex was added to an aqueous solution of magnesium sulfate as a coagulant in an amount of 1.0 mass % with respect to the nitrile rubber content, and the latex was coagulated by stirring. After this, filtration was performed while washing with water, and the obtained coagulated material was vacuum dried for 12 hours at a temperature of 60° C., to obtain nitrile rubber as a polymer.

—Metathesis of Polymer—

Next, 9 parts of the obtained polymer was dissolved in 141 parts of monochlorobenzene, and charged into a reactor. After heating the reactor to ° C., 2 L of a monochlorobenzene solution containing bis(tricyclohexylphosphine)benzylideneruthenium dichloride as a Grubbs catalyst was added so that the amount of the Grubbs catalyst with respect to 100 parts of the polymer was 0.25 parts. The reactor was then pressurized to 3.5 MPa with ethylene as a co-olefin, and metathesis reaction of the polymer was performed at a stirring rate of 600 rpm. During the reaction, the temperature was maintained constant using a cooling coil connected to a temperature controller and a heat sensor.

—Hydrogenation of Polymer—

Subsequently, the reactor was degassed three times with H2 of 0.7 MPa while continuing stirring. The temperature of the reactor was then increased to 130° C., and 1 L of a monochlorobenzene solution containing a Wilkinson catalyst and triphenylphosphine was added into the reactor. The amount of the Wilkinson catalyst with respect to 100 parts of the polymer was 0.075 parts, and the amount of the triphenylphosphine was 1 part. The temperature was then increased to 138° C., and hydrogenation reaction of the polymer was performed at a hydrogen pressure (gauge pressure) of 8.4 MPa. The reaction was ended with the end point being an iodine value of 5.0 mg/100 mg. After the reaction end, 0.2 parts of activated charcoal with an average diameter of 15 μm was added into the reactor and stirred for 30 minutes, and then filtered with a filter having a pore diameter of 5 μm. Water vapor was introduced into the filtered solution, monochlorobenzene was collected and removed by steam distillation, and the precipitated polymer (hydrogenated polymer) was separated, dried, and collected.

[Preparation of Binder Composition for Positive Electrode]

64 parts of a water dispersion of the obtained hydrogenated polymer was collected in terms of solid content, and 800 parts of N-methylpyrrolidone (NMP) as an organic solvent was added. Water was evaporated under reduced pressure, to obtain a binder composition (NMP solution) containing the hydrogenated polymer as a binder. The metal ion concentration and the solution turbidity in the obtained binder composition were measured. The results are shown in Table 1.

[Preparation of Slurry Composition for Positive Electrode]

100 parts of lithium cobalt oxide ($LiCoO_2$) (volume-average particle diameter: 20 μm) as a positive electrode active material, 1.0 part of multi-walled carbon nanotubes as a conductive material, 1.6 parts of a fluorine-containing polymer (polyvinylidene fluoride, melt viscosity: 5.0 kPa·s) as a binder, the binder composition in such an amount that the hydrogenated polymer was 0.4 parts in terms of solid content (binder proportion (binder content/(binder content+polymer content in binder composition)) being 80 mass %), and an appropriate amount of NMP as an organic solvent were added into a planetary mixer, and stirred at 50 rpm for 60 minutes. The solid content concentration at the time was 70 mass %. Subsequently, NMP was further added, and kneading was further performed using the planetary mixer so that the viscosity at a shear rate of 20 $s^{-1}$ was about 4000 mPa·s, to prepare a slurry composition for a positive electrode.

[Production of Positive Electrode for Secondary Battery]

Aluminum foil with a thickness of 15 μm was prepared as a current collector. The obtained slurry composition for a positive electrode was applied to both sides of the aluminum foil so that the coating amount after drying would be 20 mg/cm', and dried for 5 minutes at 80° C. Subsequently, the result was heat treated at 120° C. for 5 minutes to yield a web of positive electrode. This web of positive electrode was then rolled by roll pressing to produce a positive electrode in the form of a sheet composed of aluminum foil (current collector) and a positive electrode mixed material layer with a density of 3.8 $g/cm^3$. The positive electrode in the form of a sheet was cut to a width of 4.8 cm and length of 50 cm to yield a positive electrode.

[Production of Negative Electrode for Secondary Battery]

90 parts of spherical artificial graphite (volume average particle size: 12 μm) and 10 parts of SiOx (volume average particle size: 10 μm) as a negative electrode active material, 1 part of styrene butadiene polymer (volume-average particle diameter: 180 nm, glass-transition temperature: −40° C.) as a binder, 1 part of carboxymethyl cellulose as a thickener, and an appropriate amount of water were mixed in a planetary mixer to prepare a slurry composition for a negative electrode.

Next, copper foil with a thickness of 15 μm was prepared as a current collector. The slurry composition for a negative electrode was applied to both sides of the copper foil so that the coating amount after drying would be 12 mg/cm', and the slurry composition was then dried for 20 minutes at 50° C. and for 20 minutes at 110° C. Subsequently, the result was heat treated at 150° C. for 2 hours to yield a web of negative electrode. This web of negative electrode was then rolled by roll pressing to produce a negative electrode in the form of a sheet composed of copper foil (current collector) and a negative electrode mixed material layer with a density of 1.8 $g/cm^3$. The negative electrode in the form of a sheet was cut to a width of 5.0 cm and length of 52 cm to yield a negative electrode.

[Production of Secondary Battery]

The obtained positive electrode and negative electrode were wound around a 20 mm diameter core with a separator therebetween to yield a wound body. As the separator, a fine porous membrane of polypropylene with a thickness of 20 μm was used. The resulting wound body was compressed in one direction at a rate of 10 mm/s until reaching a thickness of 4.5 mm. The compressed wound body had substantially an elliptical shape in plan view, and the ratio of the major axis to the minor axis of the substantial elliptical shape was 7.7.

Fluoroethylene carbonate was mixed in a mixture of ethylene carbonate and ethyl methyl carbonate (weight ratio=3:7) so that the concentration would be 5 mass %, and further lithium hexafluorophosphate ($LiPF_6$) was dissolved so as to have a concentration of 1 mol/L. In addition, 2 vol % of vinylene carbonate was added to prepare an electrolyte solution.

The compressed wound body was housed in a predetermined aluminum laminate case along with 3.2 g of the electrolyte solution. After attaching a lead wire to predetermined locations of the positive electrode and the negative electrode, the opening of the case was thermally sealed to assemble a secondary battery. This secondary battery had a pouch-shape with a width of 35 mm, height of 48 mm, and thickness of 5 mm, and the nominal capacity of the battery was 720 mAh.

Example 2

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, an aqueous solution of magnesium sulfate as a coagulant in an amount of 5.0 mass % with respect to nitrile rubber content was used instead of an aqueous solution of magnesium sulfate as a coagulant in an amount of 1.0 mass % with respect to nitrile rubber content in Example 1. The evaluation was then performed in the same way as in Example 1. The results are shown in Table 1.

Example 3

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, an aqueous solution of magnesium sulfate as a coagulant in an amount of 7.0 mass % with respect to nitrile rubber content was used instead of an aqueous solution of magnesium sulfate as a coagulant in an amount of 1.0 mass % with respect to nitrile rubber content in Example 1. The evaluation was then performed in the same way as in Example 1. The results are shown in Table 1.

Example 4

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, an aqueous solution of calcium chloride as a coagulant in an amount of 1.0 mass % with respect to nitrile rubber content was used instead of an aqueous solution of magnesium sulfate as a coagulant in an amount of 1.0 mass % with respect to nitrile rubber content in Example 1. The evaluation was then performed in the same way as in Example 1. The results are shown in Table 1.

Example 5

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, an aqueous solution of aluminum sulfate as a coagulant in an amount of 1.0 mass % with respect to nitrile rubber content was used instead of an aqueous solution of magnesium sulfate as a coagulant in an amount of 1.0 mass % with respect to nitrile rubber content in Example 1. The evaluation was then performed in the same way as in Example 1. The results are shown in Table 1.

Example 6

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, 45 parts of acrylonitrile as a nitrile group-containing monomer and 55 parts of 1,3-butadiene as a conjugated diene monomer were added instead of 35 parts of acrylonitrile as a nitrile group-containing monomer and 65 parts of 1,3-butadiene as a conjugated diene monomer in Example 1. The evaluation was then performed in the same way as in Example 1. The results are shown in Table 1.

Example 7

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, 55 parts of acrylonitrile as a nitrile group-containing monomer and 45 parts of 1,3-butadiene as a conjugated diene monomer were added instead of 35 parts of acrylonitrile as a nitrile group-containing monomer and 65 parts of 1,3-butadiene as a conjugated diene monomer in Example 1. The evaluation was then performed in the same way as in Example 1. The results are shown in Table 1.

Example 8

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, the reaction was ended with the end point being an iodine value of 20 mg/100 mg instead of ending the reaction with the end point being an iodine value of 5.0 mg/100 mg in Example 1. The evaluation was then performed in the same way as in Example 1. The results are shown in Table 1.

Example 9

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, the reaction was ended with the end point being an iodine value of 40 mg/100 mg instead of ending the reaction with the end point being an iodine value of 5.0 mg/100 mg in Example 1. The evaluation was then performed in the same way as in Example 1. The results are shown in Table 1.

Example 10

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that 60 parts of 1,3-butadiene and 5 parts of butyl acrylate (BA) were added after adding 35 parts of acrylonitrile into the metal bottle and purging gas inside the metal bottle with nitrogen three times, instead of adding 65 parts of 1,3-butadiene after adding 35 parts of acrylonitrile into the metal bottle and purging gas inside the metal bottle with nitrogen three times in Example 1. The evaluation was then performed in the same way as in Example 1. The results are shown in Table 1.

Comparative Example 1

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, an aqueous solution of magnesium sulfate as a coagulant in an amount of 15.0 mass % with respect to nitrile rubber content was used instead of an aqueous solution of magnesium sulfate as a coagulant in an amount of 1.0 mass % with respect to nitrile rubber content in Example 1. The evaluation was then performed in the same way as in Example 1. The results are shown in Table 1.

Comparative Example 2

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, an aqueous solution of magnesium sulfate as a coagulant in an amount of 12.5 mass % with respect to nitrile rubber content was used instead of an aqueous solution of magnesium sulfate as a coagulant in an amount of 1.0 mass % with respect to nitrile rubber content in Example 1. The evaluation was then performed in the same way as in Example 1. The results are shown in Table 1.

Comparative Example 3

A hydrogenated polymer, a binder composition for a positive electrode, a slurry composition for a positive electrode, a positive electrode for a secondary battery, a negative electrode for a secondary battery, and a secondary battery were produced in the same way as in Example 1, except that, in the preparation of the polymer, the following metal salt filtration removal operation was performed in Example 1. The evaluation was then performed in the same way as in Example 1. The results are shown in Table 1.

<Metal Salt Filtration Removal Operation>

The binder composition with a concentration of 10% was filtered with a multistage filtration (produced by Roki Techno Co., Ltd., cartridge filter SLP-020) twice at 0.3 MPa and 50° C., to remove metal salt by filtration.

TABLE 1

| | Example 1 | Example 2 | Example 3 | Example 4 | Example 5 | Example 6 | Example 7 |
|---|---|---|---|---|---|---|---|
| Coagulant type | Magnesium sulfate | Magnesium sulfate | Magnesium sulfate | Calcium chloride | Aluminum sulfate | Magnesium sulfate | Magnesium sulfate |
| Coagulant addition amount (mass %) | 1.0 | 5.0 | 7.0 | 1.0 | 1.0 | 1.0 | 1.0 |
| Metal ion | Magnesium ion | Magnesium ion | Magnesium ion | Calcium ion | Aluminum ion | Magnesium ion | Magnesium ion |
| Metal ion concentration (ppm) | 1000 | 2500 | 3500 | 1000 | 1000 | 1000 | 1000 |
| Content ratio of nitrile group-containing monomer (mass %) | 35 | 35 | 35 | 35 | 35 | 45 | 55 |
| Content ratio of conjugated diene monomer and/or alkylene structure (mass %) | 65 | 65 | 65 | 65 | 65 | 55 | 45 |
| Content ratio of other monomer (mass %) | None | None | None | None | None | None | None |
| Iodine value (mg/100 mg) | 5 | 5 | 5 | 5 | 5 | 5 | 5 |
| Solution turbidity | 20 | 50 | 70 | 20 | 20 | 20 | 20 |
| Conductive material type | CNT | CNT | CNT | CNT | CNT | CNT | CNT |
| Conductive material specific surface area ($m^2/g$) | 300 | 300 | 300 | 300 | 300 | 300 | 300 |
| Binder | PVDF | PVDF | PVDF | PVDF | PVDF | PVDF | PVDF |
| Binder proportion (mass %) | 80 | 80 | 80 | 80 | 80 | 80 | 80 |
| Paste stability | A | B | C | A | A | B | C |
| Peel strength | A | B | C | A | A | B | C |
| Output characteristics | A | B | C | A | A | B | C |

| | Example 8 | Example 9 | Example 10 | Comparative Example 1 | Comparative Example 2 | Comparative Example 3 |
|---|---|---|---|---|---|---|
| Coagulant type | Magnesium sulfate | Magnesium sulfate | Magnesium sulfate | Magnesium sulfate | Magnesium sulfate | Magnesium sulfate |
| Coagulant addition amount (mass %) | 1.0 | 1.0 | 1.0 | 15.0 | 12.5 | 1.0 |
| Metal ion | Magnesium ion | Magnesium ion | Magnesium ion | Magnesium ion | Magnesium ion | Magnesium ion |
| Metal ion concentration (ppm) | 1000 | 1000 | 1000 | 6000 | 5000 | 100 |
| Content ratio of nitrile group-containing monomer (mass %) | 35 | 35 | 35 | 35 | 35 | 35 |
| Content ratio of conjugated diene monomer and/or alkylene structure (mass %) | 65 | 65 | 60 | 65 | 65 | 65 |
| Content ratio of other monomer (mass %) | None | None | BA(5) | None | None | None |
| Iodine value (mg/100 mg) | 20 | 40 | 5 | 5 | 5 | 5 |
| Solution turbidity | 20 | 20 | 20 | 100 | 81 | 0.5 |
| Conductive material type | CNT | CNT | CNT | CNT | CNT | CNT |
| Conductive material specific surface area ($m^2/g$) | 300 | 300 | 300 | 300 | 300 | 300 |
| Binder | PVDF | PVDF | PVDF | PVDF | PVDF | PVDF |
| Binder proportion (mass %) | 80 | 80 | 80 | 80 | 80 | 80 |

TABLE 1-continued

| | | | | | | |
|---|---|---|---|---|---|---|
| Paste stability | B | C | B | D | C | A |
| Peel strength | A | A | A | D | D | D |
| Output characteristics | B | C | B | D | D | A |

As can be understood from Table 1, in Examples 1 to 10, the solution turbidity of the binder composition for a positive electrode was in a range of 1 or more and 80 or less, so that the balance among the paste stability of the slurry composition for a positive electrode prepared using the binder composition for a positive electrode, the peel strength of the positive electrode mixed material layer formed using the slurry composition for a positive electrode, and the output characteristics of the secondary battery using the positive electrode including the positive electrode mixed material layer was maintained favorably. In Comparative Examples 1 and 2, the solution turbidity of the binder composition for a positive electrode was more than 80, so that the paste stability of the slurry composition for a positive electrode, the peel strength of the positive electrode mixed material layer, and the output characteristics of the secondary battery decreased. In Comparative Example 3, the solution turbidity of the binder composition for a positive electrode was less than 1, so that the peel strength of the positive electrode mixed material layer decreased.

Comparison of Examples 1 to 3 revealed the tendency that the solution turbidity increases with an increase in the metal ion concentration.

In Example 2, the solution turbidity was 50 exceeding the upper limit (40) of the more preferable range, and the paste stability of the slurry composition for a positive electrode, the peel strength of the positive electrode mixed material layer, and the output characteristics of the secondary battery decreased as compared with Example 1 in which the solution turbidity was 20 within the more preferable range (40 or less).

In Example 3, the solution turbidity was 70 exceeding the upper limit (60) of the preferable range, and the paste stability of the slurry composition for a positive electrode, the peel strength of the positive electrode mixed material layer, and the output characteristics of the secondary battery decreased as compared with Example 1 in which the solution turbidity was 20 within the preferable range (60 or less).

In Examples 4 and 5, different coagulants from that in Example 1 were used, but the paste stability of the slurry composition for a positive electrode, the peel strength of the positive electrode mixed material layer, and the output characteristics of the secondary battery were at the same level as in Example 1.

In Example 6, the content proportion of the nitrile group-containing monomer in the polymer was 45 mass % exceeding the upper limit (40 mass %) of the more preferable range, and the paste stability of the slurry composition for a positive electrode, the peel strength of the positive electrode mixed material layer, and the output characteristics of the secondary battery decreased as compared with Example 1 in which the content proportion of the nitrile group-containing monomer was 35 mass % within the more preferable range (40 mass % or less).

In Example 7, the content proportion of the nitrile group-containing monomer in the polymer was 55 mass % exceeding the upper limit (50 mass %) of the preferable range, and the paste stability of the slurry composition for a positive electrode, the peel strength of the positive electrode mixed material layer, and the output characteristics of the secondary battery decreased as compared with Example 1 in which the content proportion of the nitrile group-containing monomer was 35 mass % within the preferable range (50 mass % or less).

In Example 8, the iodine value of the hydrogenated polymer was 20 mg/100 mg exceeding the upper limit (10 mg/100 mg) of the particularly preferable range, and the paste stability of the slurry composition for a positive electrode and the output characteristics of the secondary battery decreased as compared with Example 1 in which the iodine value of the hydrogenated polymer was 5 mg/100 mg within the particularly preferable range (10 mg/100 mg or less).

In Example 9, the iodine value of the hydrogenated polymer was 40 mg/100 mg exceeding the upper limit (30 mg/100 mg) of the more preferable range, and the paste stability of the slurry composition for a positive electrode and the output characteristics of the secondary battery decreased as compared with Example 1 in which the iodine value of the hydrogenated polymer was 5 mg/100 mg within the more preferable range (30 mg/100 mg or less).

In Example 10, the polymer contained another monomer unit, and the paste stability of the slurry composition for a positive electrode and the output characteristics of the secondary battery decreased as compared with Example 1 in which the polymer did not contain another monomer unit.

INDUSTRIAL APPLICABILITY

It is therefore possible to provide a binder composition for a non-aqueous secondary battery positive electrode and a composition for a non-aqueous secondary battery positive electrode capable of stably forming a positive electrode with which a non-aqueous secondary battery having favorable output characteristics can be obtained.

It is also possible to stably provide a positive electrode for a non-aqueous secondary battery with which a non-aqueous secondary battery having favorable output characteristics can be obtained.

It is further possible to provide a non-aqueous secondary battery having favorable output characteristics.

The invention claimed is:

1. A binder composition for a non-aqueous secondary battery positive electrode, comprising:

a polymer;

an organic solvent; and a metal ion, wherein the polymer contains at least one of a conjugated diene monomer unit and an alkylene structural unit, and contains a nitrile group-containing monomer unit, solution turbidity of the binder composition for a non-aqueous secondary battery positive electrode is 1 or more and 80 or less, the metal ion includes at least one selected from the group consisting of an aluminum ion, a calcium ion, and a magnesium ion, and a concentration of the metal ion is 500 mass ppm or more and 4000 mass ppm or less.

2. The binder composition for a non-aqueous secondary battery positive electrode according to claim 1, wherein a content proportion of the nitrile group-containing monomer unit in the polymer is 20 mass % or more and 60 mass % or less.

3. The binder composition for a non-aqueous secondary battery positive electrode according to claim 1, wherein a total content proportion of the conjugated diene monomer unit and the alkylene structural unit in the polymer is 40 mass % or more and 80 mass % or less.

4. The binder composition for a non-aqueous secondary battery positive electrode according to claim 1, wherein the polymer contains the alkylene structural unit.

5. The binder composition for a non-aqueous secondary battery positive electrode according to claim 1, wherein an iodine value of the polymer is 0.01 mg/100 mg or more and 65 mg/100 mg or less.

* * * * *